United States Patent
Ni et al.

(10) Patent No.: US 10,212,734 B2
(45) Date of Patent: Feb. 19, 2019

(54) DATA TRANSMISSION METHOD, SENDER DEVICE, AND RECEIVER DEVICE

(71) Applicant: HUAWEI TECHNOLOGIES CO., LTD., Guangdong (CN)

(72) Inventors: Rui Ni, Shenzhen (CN); Yi Luo, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 170 days.

(21) Appl. No.: 15/258,986

(22) Filed: Sep. 7, 2016

(65) Prior Publication Data

US 2016/0381703 A1 Dec. 29, 2016

Related U.S. Application Data

(63) Continuation of application No. PCT/CN2014/073115, filed on Mar. 10, 2014.

(51) Int. Cl.
*H04W 74/02* (2009.01)
*H04L 27/26* (2006.01)
(Continued)

(52) U.S. Cl.
CPC .......... *H04W 74/02* (2013.01); *H04L 1/1887* (2013.01); *H04L 27/2607* (2013.01);
(Continued)

(58) Field of Classification Search
CPC ..... H04W 74/02; H04W 72/14; H04W 74/04; H04W 74/0816; H04L 27/2607
See application file for complete search history.

(56) References Cited

U.S. PATENT DOCUMENTS

2003/0043839 A1* 3/2003 Luschi ................. H04L 1/0018
370/445
2005/0135284 A1* 6/2005 Nanda ............... H04L 29/06068
370/294
(Continued)

FOREIGN PATENT DOCUMENTS

CN 1894910 A 1/2007
CN 101414900 A 4/2009
(Continued)

OTHER PUBLICATIONS

International Search Report dated Dec. 22, 2014, in International Application No. PCT/CN2014/073115.
(Continued)

*Primary Examiner* — Raj Jain
*Assistant Examiner* — Andrew C Lee
(74) *Attorney, Agent, or Firm* — Kilpatrick Townsend & Stockton LLP

(57) ABSTRACT

Embodiments of the present invention provide a data transmission method, a sender device, and a receiver device. The method includes: sending, by a sender device, to-be-transmitted data to a receiver device according to a transmission policy; and receiving, by the sender device, feedback information sent by the receiver device. In this process, for to-be-transmitted data after a guard interval in a last radio frame of any scheduling window, the sender device sends the to-be-transmitted data according to the transmission policy, so that no timeout occurs when the sender device is waiting for the feedback information, thereby achieving an objective of improving data transmission efficiency.

16 Claims, 8 Drawing Sheets

(51) Int. Cl.
*H04W 72/14* (2009.01)
*H04W 74/04* (2009.01)
*H04W 74/08* (2009.01)
*H04L 1/18* (2006.01)
*H04L 5/00* (2006.01)
*H04L 5/14* (2006.01)
*H04W 84/12* (2009.01)

(52) U.S. Cl.
CPC ........... *H04W 72/14* (2013.01); *H04W 74/04* (2013.01); *H04W 74/0816* (2013.01); *H04L 5/0055* (2013.01); *H04L 5/14* (2013.01); *H04W 84/12* (2013.01)

(56) References Cited

U.S. PATENT DOCUMENTS

| | | | | |
|---|---|---|---|---|
| 2006/0009229 A1* | 1/2006 | Yuan | ............ | H04W 72/14 455/452.1 |
| 2007/0254679 A1* | 11/2007 | Montojo | ............ | H04L 5/0053 455/458 |
| 2008/0267126 A1* | 10/2008 | Vujcic | ............ | H04B 7/2637 370/330 |
| 2009/0180435 A1* | 7/2009 | Sarkar | ............ | H04L 5/14 370/330 |
| 2009/0252100 A1* | 10/2009 | Sridhara | ............ | H04L 1/1854 370/329 |
| 2009/0316811 A1* | 12/2009 | Maeda | ............ | H04W 76/11 375/260 |
| 2010/0172299 A1* | 7/2010 | Fischer | ............ | H04W 74/002 370/328 |
| 2010/0191878 A1* | 7/2010 | Nandagopalan | ............ | H04L 47/10 710/56 |
| 2010/0232335 A1* | 9/2010 | Lee | ............ | H04W 72/005 370/312 |
| 2011/0064019 A1 | 3/2011 | Chun et al. | | |
| 2011/0141901 A1* | 6/2011 | Luo | ............ | H04L 1/1822 370/241 |
| 2011/0216676 A1* | 9/2011 | Li | ............ | H04L 1/1812 370/281 |
| 2011/0274040 A1* | 11/2011 | Pani | ............ | H04W 4/70 370/328 |
| 2011/0274077 A1* | 11/2011 | Yamada | ............ | H04W 72/042 370/329 |
| 2012/0008646 A1 | 1/2012 | Fourcand | | |
| 2013/0028161 A1* | 1/2013 | Maeda | ............ | H04L 5/0048 370/311 |
| 2013/0182679 A1* | 7/2013 | Seo | ............ | H04W 72/042 370/330 |
| 2014/0079016 A1* | 3/2014 | Dai | ............ | H04L 5/0041 370/330 |
| 2015/0023267 A1* | 1/2015 | Lim | ............ | H04L 1/1854 370/329 |
| 2015/0117319 A1* | 4/2015 | Yang | ............ | H04W 74/004 370/329 |
| 2015/0358997 A1* | 12/2015 | Yang | ............ | H04W 72/12 370/329 |

FOREIGN PATENT DOCUMENTS

| | | |
|---|---|---|
| CN | 101562897 A | 10/2009 |
| CN | 103178946 A | 6/2013 |
| CN | 103188054 A | 7/2013 |
| EP | 1909410 A1 | 4/2008 |
| EP | 2779783 A1 | 9/2014 |
| WO | 2008140223 A1 | 11/2008 |

OTHER PUBLICATIONS

Supplementary European Search Report issued in corresponding EP application (14885152.0) dated Feb. 17, 2017.
International Search Report issued in foreign priority application PCT/CN2014/073115 dated Dec. 22, 2014.

* cited by examiner

DATA TRANSMISSION METHOD, SENDER DEVICE, AND RECEIVER DEVICE

CROSS REFERENCE TO RELATED APPLICATIONS

This application is a continuation of International Patent Application No. PCT/CN2014/073115, filed on Mar. 10, 2014, which is hereby incorporated by reference in its entirety.

TECHNICAL FIELD

Embodiments of the present invention relate to the wireless communications technologies, and in particular, to a data transmission method, a sender device, and a receiver device.

BACKGROUND

Currently, a new time division duplex (Time Division Duplex, TDD) system is proposed, and the system is a half-contention and half-scheduling system. FIG. 1 is a structural diagram of a radio frame timeslot in a TDD system in the prior art. As shown in FIG. 1, a contention window (Contention Window, CW) and a scheduling window (Scheduling Window, SW) appear alternately. Because of uncertainty of a random contention manner, a CW period length dynamically changes and is unpredictable. However, an SW period length is predictable; each SW includes N radio frames (Radio Frame, RF), and there is a guard interval 1 (GAP1) between radio frames. Each radio frame includes a frame header (Header) and a digital field part. The digital field part includes two structures: a downlink period precedes an uplink period; and an uplink period precedes a downlink period (this scenario is not shown in the figure). In each structure, there are several downlink subframes in the downlink period, there are several uplink subframes in the uplink period, and there is a guard interval 2 (GAP2) between the uplink period and the downlink period. When data is transmitted in the TDD system, a sender device determines, according to feedback information, whether a receiver device correctly receives the data, so as to determine a next action. The feedback information includes an acknowledgement (Acknowledgement, ACK) and a negative acknowledgement (Negative Acknowledgement, NACK).

A radio frame with a data field part in which a downlink period precedes an uplink period is used as an example. In the prior art, transmission is performed after uplink data and downlink data are distinguished. For details, reference may be made to FIG. 2 and FIG. 3. FIG. 2 is a schematic diagram of downlink data transmission in the prior art; FIG. 3 is a schematic diagram of uplink data transmission in the prior art. As shown in FIG. 2, data 1 (DATA1) is sent in a downlink period of an $n^{th}$ radio frame, and the receiver device sends feedback information, for example, an ACK1, in an uplink period of the $n^{th}$ radio frame. In this process, the DATA1 and the ACK1 are completed within a same radio frame, and there is no problem with feedback information transmission. However, in FIG. 3, data DATA2 is sent in an uplink period of an $n^{th}$ radio frame, and the receiver device can send feedback information, for example, an ACK2, only in a downlink period of an $(n+1)^{th}$ radio frame. Likewise, data DATA3 is sent in the downlink period of the $(n+1)^{th}$ radio frame, and the receiver device needs to send feedback information, for example, an ACK3, only in a downlink period of an $(n+2)^{th}$ radio frame. Therefore, it can be learned that, for a radio frame in which a downlink period precedes an uplink period, when uplink data is transmitted, two radio frames need to be occupied to complete the uplink data and feedback information corresponding to the uplink data. In this way, for a last radio frame in a scheduling window, when sending any DATA in an uplink period, the sender device needs to wait for a CW with an unpredictable length before corresponding feedback information may be received. Consequently, a timeout occurs when the sender device is waiting for the feedback information, the sender device needs to resend the DATA in an uplink period or stops sending the data, and data transmission efficiency is low.

Likewise, when the data field part of the radio frame is of a structure in which an uplink period precedes a downlink period, for a last radio frame in a scheduling window, the sender device needs to wait for a CW with an unpredictable length before corresponding feedback information may be received. Consequently, a timeout occurs when the sender device is waiting for the feedback information, the sender device needs to resend the DATA in an uplink period or stops sending the data, and data transmission efficiency is low.

SUMMARY

Embodiments of the present invention provide a data transmission method, a sender device, and a receiver device. To-be-transmitted data after a guard interval of a last radio frame of a scheduling window is sent according to a transmission policy, so that no timeout occurs when the sender device is waiting for feedback information, thereby achieving an objective of improving data transmission efficiency.

According to a first aspect, an embodiment of the present invention provides a data transmission method, including: sending, by a sender device, to-be-transmitted data to a receiver device according to a transmission policy, where the to-be-transmitted data is data carried by a subframe that is after a guard interval of a last radio frame in a first scheduling window; and receiving, by the sender device, feedback information sent by the receiver device.

In a first possible implementation manner of the first aspect, the to-be-transmitted data is sent by the sender device over a common channel, and the feedback information is received by the sender device over the common channel According to the first possible implementation manner of the first aspect, the common channel is a channel over which the sender device and the receiver device transmit data.

In a second possible implementation manner of the first aspect, the to-be-transmitted data is sent by the sender device over a common channel and the feedback information is received by the sender device over a dedicated channel. According to the second possible implementation manner of the second aspect, the common channel is a channel over which the sender device and the receiver device transmit data, and the dedicated channel is a channel over which the sender device and the receiver device transmit feedback information.

With reference to the first aspect and the first or the second possible implementation manner of the first aspect, in a third possible implementation manner of the first aspect, the transmission policy is buffering the to-be-transmitted data and sending the to-be-transmitted data in a non-last radio frame of a second scheduling window, where the second scheduling window is any scheduling window after the first scheduling window. According to the third possible implementation manner of the first aspect, sending, by the sender device, the to-be-transmitted data to a receiver device according to a transmission policy includes: sending, by the sender device, the to-be-transmitted data in the non-last radio frame in the second scheduling window according to the transmission policy. According to the third possible implementation manner of the first aspect, receiving, by the sender device, feedback information sent by the receiver device includes: receiving, by the sender device, the feedback information sent by the receiver device in the non-last radio frame in the second scheduling window.

With reference to the first aspect and the first or the second possible implementation manner of the first aspect, in a fourth possible implementation manner of the first aspect, the transmission policy is setting a feedback time length of feedback information of the to-be-transmitted data to be greater than a time length of a contention window between the first scheduling window and a third scheduling window, where the third scheduling window is the first scheduling window after the first scheduling window. According to the fourth possible implementation manner of the first aspect, sending, by the sender device, to-be-transmitted data to a receiver device according to a transmission policy includes: sending, by the sender device, the to-be-transmitted data in the last radio frame in the first scheduling window according to the to-be-transmitted policy. According to the fourth possible implementation manner of the first aspect, receiving, by the sender device, feedback information sent by the receiver device includes: receiving, by the sender device, the feedback information sent by the receiver device in a radio frame in the third scheduling window.

With reference to the fourth possible implementation manner of the first aspect, in a fifth possible implementation manner of the first aspect, setting the feedback time length of feedback information of the to-be-transmitted data to be greater than a time length of a contention window between the first scheduling window and a third scheduling window includes: setting the feedback time length of the feedback information of the to-be-transmitted data to be greater than an average time length of a contention window before the first contention window; or setting the feedback time length of the feedback information of the to-be-transmitted data to be greater than a time length of any contention window before the first contention window.

With reference to the second possible implementation manner of the first aspect, in a sixth possible implementation manner of the first aspect, the transmission policy is that the receiver device sends feedback information of the to-be-transmitted data in a scheduling window that is on the dedicated channel and that is corresponding to the first scheduling window. According to the sixth possible implementation manner of the first aspect, sending, by the sender device, the to-be-transmitted data to a receiver device according to a transmission policy includes: sending, by the sender device, the to-be-transmitted data in a non-last radio frame in the first scheduling window according to the to-be-transmitted policy. According to the sixth possible implementation manner of the first aspect, receiving, by the sender device, the feedback information sent by the receiver device includes: receiving, by the sender device, the feedback information sent by the receiver device in the scheduling window that is on the dedicated channel and that is corresponding to the first scheduling window.

With reference to the third possible implementation manner of the first aspect, in a seventh possible implementation manner of the first aspect, the method further includes: adjusting, by the sender device, a quantity of subframes before the guard interval of the last radio frame in the first scheduling window and a quantity of subframes after the guard interval.

With reference to the seventh possible implementation manner of the first aspect, in an eighth possible implementation manner of the first aspect, adjusting, by the sender device, the quantity of subframes before the guard interval of the last radio frame and a quantity of subframes after the guard interval includes: if a data volume carried by the subframes that are after the guard interval is greater than a data volume carried by the subframes that are before the guard interval, increasing the quantity of subframes before the guard interval, where the increased data volume of the subframes after the guard interval of the last radio frame does not exceed a data volume of subframes after a guard interval of another radio frame in the first scheduling window; or if a data volume carried by the subframes that are after the guard interval is less than a data volume carried by the subframes that are before the guard interval, decreasing the data volume of the subframes after the guard interval and increasing the quantity of subframes before the guard interval.

With reference to any one of the first aspect or the first to the eighth possible implementation manners of the first aspect, in a ninth possible implementation manner of the first aspect, before sending, by the sender device, the to-be-transmitted data to a receiver device according to the transmission policy, the method further includes: receiving, by the sender device, the transmission policy sent by the receiver device; or configuring, by the sender device, the to-be-transmitted policy.

According to a second aspect, an embodiment of the present invention provides a data transmission method, including: receiving, by a receiver device, to-be-transmitted data sent by a sender device according to a transmission policy, where the to-be-transmitted data is data carried by a subframe that is after a guard interval of a last radio frame in a first scheduling window; and sending, by the receiver device, feedback information to the sender device.

In a first possible implementation manner of the second aspect, the to-be-transmitted data is received by the receiver device over the common channel and the feedback information is sent by the receiver device over the common channel. According to the first possible implementation manner of the second aspect, the common channel is a channel over which the sender device and the receiver device transmit data.

In a second possible implementation manner of the second aspect, the to-be-transmitted data is received by the receiver device over a common channel and the feedback information sent by the receiver device over a dedicated channel. According to the second possible implementation manner of the second aspect, the common channel is a channel over which the sender device and the receiver device transmit data, and the dedicated channel is a channel over which the sender device and the receiver device transmit feedback information.

With reference to the second aspect and the first or the second possible implementation manner of the second aspect, in a third possible implementation manner of the second aspect, the transmission policy is buffering the to-be-transmitted data and sending the to-be-transmitted data in a non-last radio frame of a second scheduling window, where the second scheduling window is any scheduling window after the first scheduling window. According to the third possible implementation manner of the second aspect, receiving, by the receiver device, the to-be-transmitted data sent by the sender device according to a transmission policy includes: receiving, by the receiver device, the to-be-transmitted data sent by the sender device in the non-last radio frame in the second scheduling window according to the transmission policy. According to the third possible implementation manner of the second aspect, sending, by the receiver device, the feedback information to the sender device includes: sending, by the receiver device, the feedback information to the sender device in the non-last radio frame in the second scheduling window.

With reference to the second aspect and the first or the second possible implementation manner of the second aspect, in a fourth possible implementation manner of the first aspect, the transmission policy is setting a feedback time length of feedback information of the to-be-transmitted data to be greater than a time length of a contention window between the first scheduling window and a third scheduling window, where the third scheduling window is the first scheduling window after the first scheduling window. According to the fourth possible implementation manner of the second aspect, receiving, by the receiver device, the to-be-transmitted data sent by the sender device according to a transmission policy includes: receiving, by the receiver device, the to-be-transmitted data sent by the sender device in the last radio frame in the first scheduling window according to the transmission policy. According to the fourth possible implementation manner of the second aspect, sending, by the receiver device, the feedback information to the sender device includes: sending, by the receiver device, the feedback information to the sender device in a radio frame in the third scheduling window.

With reference to the second possible implementation manner of the second aspect, in a fifth possible implementation manner of the second aspect, the transmission policy is that the receiver device sends feedback information of the to-be-transmitted data in a scheduling window that is on the dedicated channel and that is corresponding to the first scheduling window. According to the fifth possible implementation manner of the second aspect, receiving, by the receiver device, the to-be-transmitted data sent by the sender device according to a transmission policy includes: receiving, by the receiver device, the to-be-transmitted data sent by the sender device in a non-last radio frame in the first scheduling window according to the to-be-transmitted policy. According to the fifth possible implementation manner of the second aspect, sending, by the receiver device, feedback information to the sender device includes: sending, by the receiver device, the feedback information in the scheduling window that is on the dedicated channel and that is corresponding to the first scheduling window.

With reference to any one of the second aspect or the first to the fifth possible implementation manners of the second aspect, in a sixth possible implementation manner of the second aspect, before the receiving, by a receiver device, to-be-transmitted data sent by a sender device according to a transmission policy, the method further includes: receiving, by the receiver device, the transmission policy sent by the sender device; or configuring, by the receiver device, the to-be-transmitted policy.

According to a third aspect, an embodiment of the present invention provides a sender device, including: a sending module, and a receiving module. The sending module is configured to send to-be-transmitted data to a receiver device according to a transmission policy. The to-be-transmitted data is data carried by a subframe that is after a guard interval of a last radio frame in a first scheduling window. The receiving module is configured to receive feedback information sent by the receiver device.

In a first possible implementation manner of the third aspect, the sending module is configured to send, over a common channel, the to-be-transmitted data to the receiver device according to the transmission policy, where the common channel is a channel over which the sender device and the receiver device transmit data; and the receiving module is configured to receive, over the common channel, the feedback information sent by the receiver device.

In a second possible implementation manner of the third aspect, the sending module is configured to send, over a common channel, the to-be-transmitted data to the receiver device according to the transmission policy. The common channel is a channel over which the sender device and the receiver device transmit data. The receiving module is configured to receive, over a dedicated channel, the feedback information sent by the receiver device, where the dedicated channel is a channel over which the sender device and the receiver device transmit feedback information.

With reference to the third aspect and the first or the second possible implementation manner of the third aspect, in a third possible implementation manner of the third aspect, when the transmission policy is buffering the to-be-transmitted data and sending the to-be-transmitted data in a non-last radio frame of a second scheduling window, and the second scheduling window is any scheduling window after the first scheduling window, the sending module is configured to send the to-be-transmitted data in the non-last radio frame in the second scheduling window according to the transmission policy. The receiving module is configured to receive the feedback information sent by the receiver device in the non-last radio frame in the second scheduling window.

With reference to the third aspect and the first or the second possible implementation manner of the third aspect, in a fourth possible implementation manner of the third aspect, when the transmission policy is setting a feedback time length of feedback information of the to-be-transmitted data to be greater than a time length of a contention window between the first scheduling window and a third scheduling window, and the third scheduling window is the first scheduling window after the first scheduling window, the sending module is configured to send the to-be-transmitted data in the last radio frame in the first scheduling window according to the to-be-transmitted policy. The receiving module is configured to receive the feedback information sent by the receiver device in a radio frame in the third scheduling window.

With reference to the fourth possible implementation manner of the third aspect, in a fifth possible implementation manner of the third aspect, the sender device further includes a setting module. The setting module is configured to: set the feedback time length of the feedback information of the to-be-transmitted data to be greater than an average time length of a contention window before the first contention window; or set the feedback time length of the feedback information of the to-be-transmitted data to be greater than a time length of any contention window before the first contention window.

With reference to the second possible implementation manner of the third aspect, in a sixth possible implementation manner of the third aspect, when the transmission policy is that the receiver device sends feedback information of the to-be-transmitted data in a scheduling window that is on the dedicated channel and that is corresponding to the first scheduling window, the sending module is configured to send the to-be-transmitted data in a non-last radio frame in the first scheduling window according to the to-be-transmitted policy. The receiving module is configured to receive the feedback information sent by the receiver device in the scheduling window that is on the dedicated channel and that is corresponding to the first scheduling window.

With reference to the third possible implementation manner of the third aspect, in a seventh possible implementation manner of the third aspect, the sender device further includes an adjustment module. The adjustment module is configured to adjust a quantity of subframes before the guard interval of the last radio frame in the first scheduling window and a quantity of subframes after the guard interval.

With reference to the seventh possible implementation manner of the third aspect, in an eighth possible implementation manner of the third aspect, the sender device further includes a determining module. The determination module is configured to determine whether a data volume carried by the subframes that are before the guard interval is greater than a data volume carried by the subframes that are after the guard interval. According to the eighth possible implementation manner of the third aspect, the adjustment module is configured to: when the determining module determines that the data volume carried by the subframes that are after the guard interval is greater than the data volume carried by the subframes that are before the guard interval, increase the quantity of subframes before the guard interval, where the increased data volume of the subframes after the guard interval of the last radio frame does not exceed a data volume of subframes after a guard interval of another radio frame in the first scheduling window; or when the determining module determines that the data volume carried by the subframes that are after the guard interval is less than the data volume carried by the subframes that are before the guard interval, decrease the data volume of the subframes after the guard interval and increase the quantity of subframes before the guard interval.

With reference to any one of the third aspect or the first to the eighth possible implementation manners of the third aspect, in a ninth possible implementation manner of the third aspect, the receiving module is further configured to: before the sending module sends the to-be-transmitted data to the receiver device according to the transmission policy, receive the transmission policy sent by the receiver device; or the sender device further includes a configuration module. The configuration module is configured to configure the to-be-transmitted policy before the sending module sends the to-be-transmitted data to the receiver device according to the transmission policy.

According to a fourth aspect, an embodiment of the present invention provides a receiver device, including a receiving module and a sending module. The receiving module is configured to receive to-be-transmitted data sent by a sender device according to a transmission policy, where the to-be-transmitted data is data carried by a subframe that is after a guard interval of a last radio frame in a first scheduling window. The sending module is configured to send feedback information to the sender device.

In a first possible implementation manner of the fourth aspect, the receiving module is configured to receive, over a common channel, the to-be-transmitted data that is sent by the sender device according to the transmission policy, where the common channel is a channel over which the sender device and the receiver device transmit data. The sending module is configured to send, over the common channel, the feedback information to the sender device.

In a second possible implementation manner of the fourth aspect, the receiving module is configured to receive, over a common channel, the to-be-transmitted data that is sent by the sender device according to the transmission policy, where the common channel is a channel over which the sender device and the receiver device transmit data. The sending module is configured to send the feedback information to the sender device over a dedicated channel, where the dedicated channel is a channel over which the sender device and the receiver device transmit feedback information.

With reference to the fourth aspect and the first or the second possible implementation manner of the fourth aspect, in a third possible implementation manner of the fourth aspect, when the transmission policy is buffering the to-be-transmitted data and sending the to-be-transmitted data in a non-last radio frame of a second scheduling window, and the second scheduling window is any scheduling window after the first scheduling window, the receiving module is configured to receive the to-be-transmitted data sent by the sender device in the non-last radio frame in the second scheduling window according to the transmission policy. The sending module is configured to send the feedback information to the sender device in the non-last radio frame in the second scheduling window.

With reference to the fourth aspect and the first or the second possible implementation manner of the fourth aspect, in a fourth possible implementation manner of the fourth aspect, when the transmission policy is setting a feedback time length of feedback information of the to-be-transmitted data to be greater than a time length of a contention window between the first scheduling window and a third scheduling window, and the third scheduling window is the first scheduling window after the first scheduling window, the receiving module is configured to receive the to-be-transmitted data sent by the sender device in the last radio frame in the first scheduling window according to the transmission policy. The sending module is configured to send the feedback information to the sender device in a radio frame in the third scheduling window.

With reference to the second possible implementation manner of the fourth aspect, in a fifth possible implementation manner of the fourth aspect, when the transmission policy is that the receiver device sends feedback information of the to-be-transmitted data in a scheduling window that is on the dedicated channel and that is corresponding to the first scheduling window, the receiving module is configured to receive the to-be-transmitted data sent by the sender device in a non-last radio frame in the first scheduling window according to the to-be-transmitted policy. The sending module is configured to send the feedback information in the scheduling window that is on the dedicated channel and that is corresponding to the first scheduling window.

With reference to any one of the fourth aspect or the first to the fifth possible implementation manners of the fourth aspect, in a sixth possible implementation manner of the fourth aspect, the receiving module is further configured to: before the to-be-transmitted data that is sent by the sender device according to the transmission policy is received, receive the transmission policy sent by the sender device; or the receiver device further includes a configuration module, configured to configure the to-be-transmitted policy before the to-be-transmitted data that is sent by the sender device according to the transmission policy is received.

According to a fifth aspect, an embodiment of the present invention provides a sender device, including: a processor and a memory, where the memory stores an executable instruction; and when the sender device runs, the processor communicates with the memory, and the processor executes the executable instruction to enable the sender device to execute the method according to any one of the first aspect or the first to the ninth possible implementation manners of the first aspect.

According to a sixth aspect, an embodiment of the present invention provides a receiver device, including: a processor and a memory, where the memory stores an executable instruction; and when the receiver device runs, the processor communicates with the memory, and the processor executes the executable instruction to enable the receiver device to execute the method according to any one of the second aspect or the first to the sixth possible implementation manners of the second aspect.

According to the data transmission method, the sender device, and the receiver device provided in the embodiments of the present invention, the sender device sends to-be-transmitted data to the receiver device according to a transmission policy that does not make a transmission manner of data carried by a subframe that is after a guard interval cause a timeout in waiting for feedback information, and receives feedback information sent by the receiver device. In this process, for to-be-transmitted data after a guard interval in a last radio frame of any scheduling window, the sender device sends the to-be-transmitted data according to the transmission policy, so that no timeout occurs when the sender device is waiting for the feedback information, thereby achieving an objective of improving data transmission efficiency.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 2:
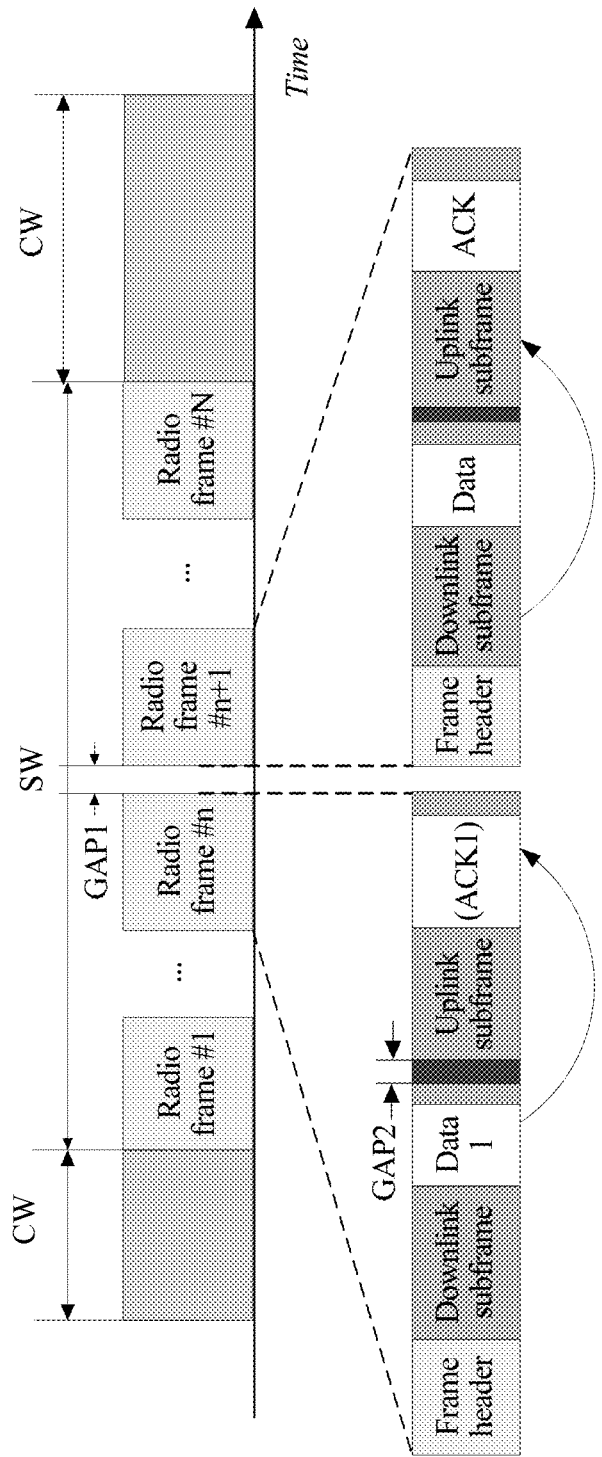
FIG. 2 is a schematic diagram of transmitting downlink data in the prior art.
Figure 3:
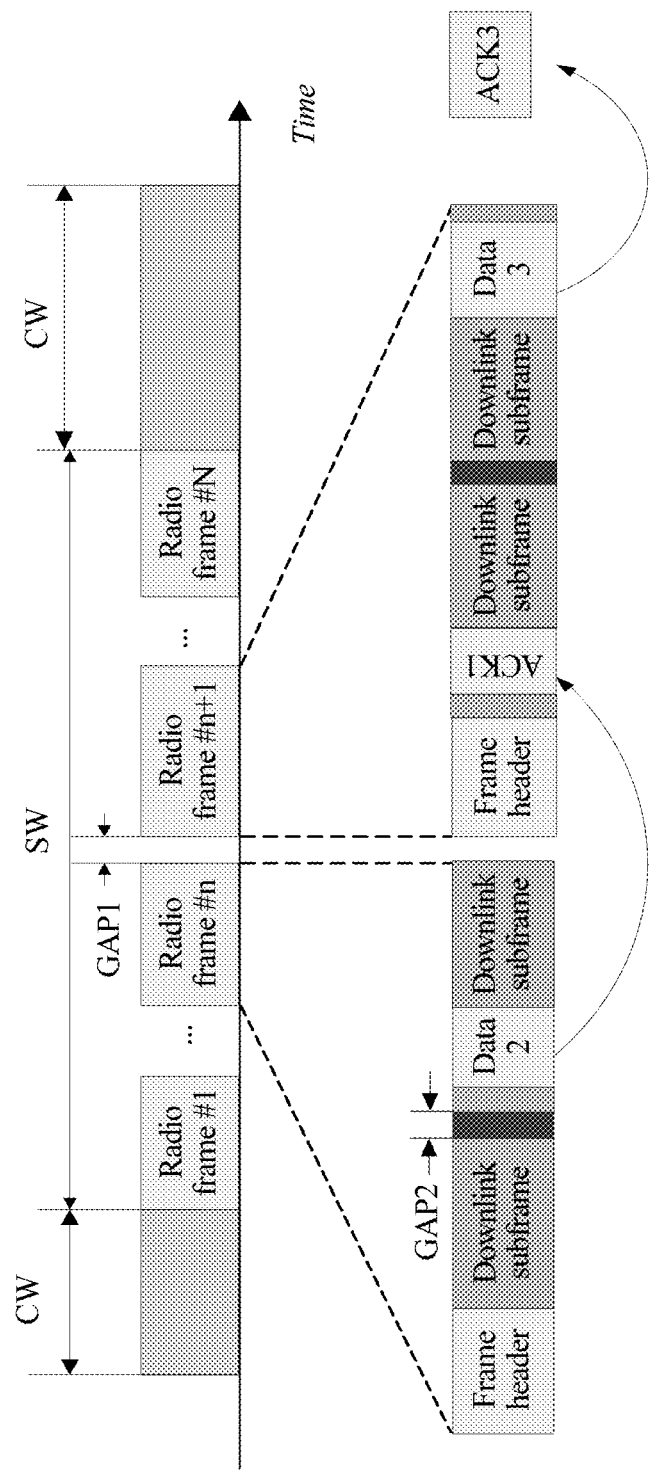
FIG. 3 is a schematic diagram of transmitting uplink data in the prior art.

In a digital communications protocol, after data is sent, a sender device determines, according to feedback information, whether a receiver device correctly receives the data, where the feedback information is divided into an ACK and an NACK. Specifically, if the receiver device successfully receives the data, the receiver device sends a feedback ACK to the sender device, so that the sender device sends next data; or if the receiver device does not successfully receive the data, the receiver device sends a feedback NACK to the sender device, so that the sender device resends current data. In this process, if the sender device does not receive the returned feedback information, the sender device resends a current data packet or stops sending the data. A specific situation depends on an adopted network protocol. The feedback information, ACK and NACK, is generally an American Standard Code for Information Interchange (American Standard Code for Information Interchange, ASCII) character, and feedback information in different protocols is generally different. It can be learned from FIG. 1 to FIG. 3 that, in the prior art, in a TDD system in which a CW and an SW appear alternately, data carried by a subframe that is after a GAP2 of a last radio frame in each SW and feedback information corresponding to the data are in different radio frames. Consequently, the receiver device needs to wait for a contention window with an unpredictable length before the feedback information may be transmitted to the sender device, the sender device needs to resend the DATA in an uplink period or stops sending the data, and data transmission efficiency is low.

In view of this, an embodiment of the present invention provides a data transmission method, so as to resolve a problem in the prior art that low data transmission efficiency is caused by a timeout of feedback information. For details, reference may be made to FIG. 4.

Figure 4:
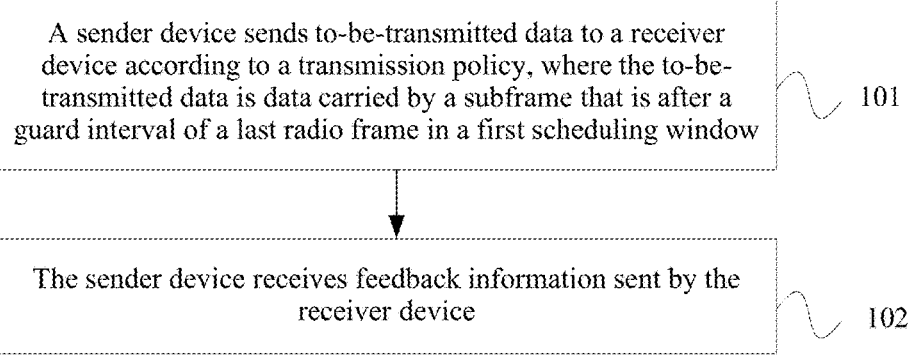
FIG. 4 is a flowchart of a data transmission method according to Embodiment 1 of the present invention.

FIG. 4 is a flowchart of a data transmission method according to one embodiment of the present invention. This embodiment illustrates the present invention in detail from a perspective of a sender device. This embodiment of the present invention is applied to a TDD system in which a CW and an SW appear alternately. A scenario in which a timeout occurs in feedback information of data carried by a subframe that is after a guard interval of a last radio frame in an SW needs to be prevented. Specifically, this embodiment includes the following steps:

At 101, a sender device sends to-be-transmitted data to a receiver device according to a transmission policy, where the to-be-transmitted data is data carried by a subframe that is after a guard interval of a last radio frame in a first scheduling window.

The sender device and the receiver device are, for example, network access points or user terminals. The first scheduling window is, for example, any SW in the TDD system in which a CW and an SW appear alternately, and the last radio frame is a radio frame at the end of the first scheduling window. When a structure of a data field part of the last radio frame is a structure in which a downlink period precedes an uplink period, a subframe after the guard interval is an uplink subframe, and data carried by the subframe that is after the guard interval is uplink data. When a structure of a data field part of the last radio frame is a structure in which an uplink period precedes a downlink period, a subframe after the guard interval is a downlink subframe, and data carried by the subframe that is after the guard interval is downlink data. The transmission policy is a policy that does not make a transmission manner of the data carried by the subframe that is after the guard interval to cause a timeout in waiting for feedback information. The transmission policy may be configured by the sender device itself or configured and sent by another network element, for example, the receiver device. In this step, the sender device sends, to the receiver device according to the transmission policy, the data carried by the subframe that is after the guard interval of the last radio frame in the first scheduling window.

At 102, the sender device receives feedback information sent by the receiver device.

After the sender device sends the to-be-transmitted data, if the receiver device successfully receives the to-be-transmitted data, the receiver device sends an ACK to the sender device, so that the sender device sends next data; or if the receiver device does not successfully receive the to-be-transmitted data, the receiver device returns an NACK to the sender device, so that the sender device resends the to-be-transmitted data.

According to the data transmission method provided in this embodiment of the present invention, according to a transmission policy that does not make a transmission manner of data carried by a subframe after a guard interval to cause a timeout in waiting for feedback information, a sender device sends to-be-transmitted data to a receiver device and receives feedback information sent by the receiver device. In this process, for to-be-transmitted data after a guard interval in a last radio frame of any scheduling window, the sender device sends the to-be-transmitted data according to the transmission policy, so that no timeout occurs when the sender device is waiting for the feedback information, thereby achieving an objective of improving data transmission efficiency.

Optionally, in the foregoing embodiment, there is a common channel between the sender device and the receiver device. The sender device can send, over the common channel, the to-be-transmitted data to the receiver device according to the transmission policy, and can receive, over the common channel, the feedback information sent by the receiver device.

Optionally, in the foregoing embodiment, there are a common channel and a dedicated channel between the sender device and the receiver device. The sender device can send, over the common channel, the to-be-transmitted data to the receiver device according to the transmission policy, and can receive, over the dedicated channel, the feedback information sent by the receiver device.

Optionally, in the foregoing embodiment, the transmission policy is buffering the data and delaying transmission of the to-be-transmitted data. In this transmission policy, the sender device buffers the to-be-transmitted data and sends the to-be-transmitted data in a non-last radio frame of a second scheduling window, where the second scheduling window is any scheduling window after the first scheduling window. In this case, the sender device sends, according to the transmission policy, the to-be-transmitted data in a subframe that is after a guard interval of the non-last radio frame in the second scheduling window, and receives feedback information sent by the receiver device in a subframe that is before the guard interval of the non-last radio frame in the second scheduling window.

Optionally, in the foregoing embodiment, the transmission policy is normally sending the to-be-transmitted data, but prolonging a feedback time length of feedback information corresponding to the data and notifying the receiver device of a reset feedback information time length. In this policy, the sender device sets a feedback time length of feedback information of the to-be-transmitted data to be greater than a time length of a contention window between the first scheduling window and a third scheduling window, where the third scheduling window is the first scheduling window after the first scheduling window. In this case, the sender device sends, according to the to-be-transmitted policy, the to-be-transmitted data in a subframe that is after a guard interval of the last radio frame in the first scheduling window, and receives feedback information sent by the receiver device in a subframe that is before a guard interval of a radio frame in the third scheduling window.

Further, optionally, before the sender device sends the to-be-transmitted data in the last radio frame in the first scheduling window according to the to-be-transmitted policy, the method further includes: setting the feedback time length of the feedback information of the to-be-transmitted data to be greater than an average time length of a contention window within a period of time before the first contention window. Because the average time length of the contention window may reflect an average level of each CW time length within a period of time, after the feedback time length of the feedback information of the to-be-transmitted data is set to be greater than the average time length, a length of the feedback time length is generally greater than a feedback time length before the setting is performed. Alternatively, the sender device sets a sending manner of the to-be-transmitted data to a feedback information delaying manner, and in the feedback information delaying manner, the feedback time length of the feedback information of the to-be-transmitted data is greater than a time length of any contention window before the first contention window. The feedback information delaying manner may be, for example, a processing procedure of a delay-ACK that is specified in the Institute of Electrical and Electronics Engineers (Institute of Electrical and Electronics Engineers, IEEE) 802.11. In this processing procedure, a time length for a timeout in waiting for feedback information such as an ACK may be set to be very long, and even a limitation on a timeout in waiting for feedback information may be canceled. In this way, the feedback time length of the feedback information is greater than a time length of any contention window, and no timeout occurs in waiting for the feedback information corresponding to the to-be-transmitted data.

Optionally, in the foregoing embodiment, when there are a common channel and a dedicated channel between the sender device and the receiver device, the transmission policy may further be that the receiver device sends the feedback information of the to-be-transmitted data in a scheduling window that is on the dedicated channel and that is corresponding to the first scheduling window. In this case, the sender device sends the to-be-transmitted data in a subframe that is after a guard interval of a non-last radio frame in the first scheduling window, and receives the feedback information sent by the receiver device in the scheduling window that is on the dedicated channel and that is corresponding to the first scheduling window.

Further, optionally, when there are a common channel and a dedicated channel between the sender device and the receiver device, and when the sender device uses the transmission policy of buffering the data and delaying transmission of the to-be-transmitted data, the sender device may further adjust the quantity of subframes that are before the guard interval of the last radio frame in the first scheduling window and the quantity of subframes after the guard interval.

Specifically, the sender device first determines whether a data volume carried by the subframes that are before the guard interval is greater than a data volume carried by the subframes that are after the guard interval, and if the data volume carried by the subframes that are after the guard interval is greater than the data volume carried by the subframes that are before the guard interval, the quantity of subframes before the guard interval is increased, where the increased data volume of the subframes after the guard interval of the last radio frame does not exceed a data volume of subframes after a guard interval of another radio frame in the first scheduling window. Alternatively, if the sender device determines that the data volume carried by the subframes that are after the guard interval is less than the data volume carried by the subframes that are before the guard interval, the data volume of the subframes after the guard interval is decreased and the quantity of subframes before the guard interval is increased.

Figure 5:
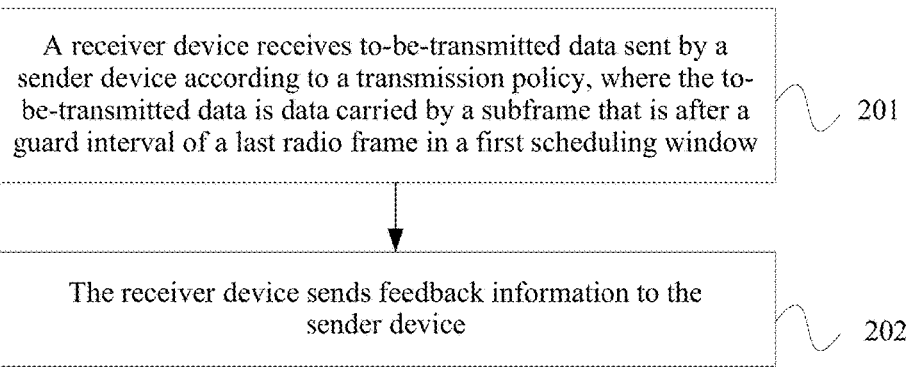
FIG. 5 is a flowchart of a data transmission method according to Embodiment 2 of the present invention.

FIG. 5 is a flowchart of a data transmission method according to another embodiment of the present invention. This embodiment illustrates the present invention in detail from a perspective of a receiver device. This embodiment of the present invention is applied to a TDD system in which a CW and an SW appear alternately. A scenario in which a timeout occurs in feedback information of data carried by a subframe that is after a guard interval of a last radio frame in an SW needs to be prevented. Specifically, this embodiment includes the following steps:

At 201, a receiver device receives to-be-transmitted data sent by a sender device according to a transmission policy, where the to-be-transmitted data is data carried by a subframe that is after a guard interval of a last radio frame in a first scheduling window.

For related concepts such as the receiver device, the sender device, the transmission policy, the to-be-transmitted data, the first scheduling window, and the last radio frame, reference may be made to step 101 in the embodiment shown in FIG. 4, and details of such are thus not repeated for the sake of clarity. In this step, the sender device sends, to the receiver device according to the transmission policy, the data carried by the subframe that is after the guard interval of the last radio frame in the first scheduling window, and correspondingly, the receiver device receives the data.

At 202, the receiver device sends feedback information to the sender device.

After receiving the to-be-transmitted data, the receiver device determines whether the to-be-transmitted data is successfully received, and if the to-be-transmitted data is successfully received, sends an ACK to the sender device, so that the sender device sends next data; or if the receiver device does not successfully receive the to-be-transmitted data, the receiver device returns an NACK to the sender device, so that the sender device resends the to-be-transmitted data.

According to the data transmission method provided in this embodiment of the present invention, a receiver device receives to-be-transmitted data sent by a sender device according to a transmission policy that does not make a transmission manner of data carried by a subframe that is after a guard interval cause a timeout in waiting for feedback information, and sends feedback information to the sender device. In this process, for to-be-transmitted data after a guard interval in a last radio frame in any scheduling window, the sender device sends the to-be-transmitted data according to the transmission policy, and the receiver device sends the feedback information to the sender device for the received to-be-transmitted data, so that no timeout occurs when the sender device is waiting for the feedback information, thereby achieving an objective of improving data transmission efficiency.

Optionally, in the foregoing embodiment illustrated in FIG. 5, there is a common channel between the receiver device and the sender device. The receiver device can receive, over the common channel, the to-be-transmitted data that is sent by the sender device according to the transmission policy, and can send, over the common channel, the feedback information to the sender device.

Optionally, in the foregoing embodiment illustrated in FIG. 5, there are a common channel and a dedicated channel between the receiver device and the sender device. The receiver device can receive, over the common channel, the to-be-transmitted data that is sent by the sender device according to the transmission policy, and can send the feedback information to the sender device over the dedicated channel.

Optionally, in the foregoing embodiment illustrated in FIG. 5, the transmission policy is buffering the data and delaying transmission of the to-be-transmitted data. In this transmission policy, the sender device buffers the to-be-transmitted data and sends the to-be-transmitted data in a non-last radio frame of a second scheduling window, where the second scheduling window is any scheduling window after the first scheduling window. In this case, the receiver device can receive the to-be-transmitted data that is sent by the sender device according to the transmission policy and in a subframe that is after a guard interval of the non-last radio frame in the second scheduling window, and cam send the feedback information to the sender device in a subframe before the guard interval of the non-last radio frame in the second scheduling window.

Optionally, in the foregoing embodiment illustrated in FIG. 5, the transmission policy is normally sending the to-be-transmitted data, but prolonging a feedback time length of feedback information corresponding to the data and notifying the receiver device of a reset feedback information time length. In this policy, the sender device sets a feedback time length of feedback information of the to-be-transmitted data to be greater than a time length of a contention window between the first scheduling window and a third scheduling window, where the third scheduling window is the first scheduling window after the first scheduling window. In this case, the receiver device receives the to-be-transmitted data sent by the sender device in the last radio frame in the first scheduling window according to the transmission policy, and sends the feedback information to the sender device in a subframe before a guard interval of a radio frame in the third scheduling window.

Further, optionally, when there are a common channel and a dedicated channel between the sender device and the receiver device, the transmission policy may further be that the receiver device sends the feedback information of the to-be-transmitted data in a scheduling window that is on the dedicated channel and that is corresponding to the first scheduling window. In this case, the receiver device sends the to-be-transmitted data in the subframe after the guard interval of the non-last radio frame in the first scheduling window, and sends the feedback information in the scheduling window that is on the dedicated channel and that is corresponding to the first scheduling window.

Optionally, in the foregoing embodiment illustrated in FIG. 5, before the receiver device receives the to-be-transmitted data that is sent by the sender device according to the transmission policy, the method further includes: receiving the transmission policy sent by the sender device; or, configuring, by the receiver device, a to-be-transmitted policy.

The foregoing FIG. 4 and FIG. 5 illustrate the present invention in detail respectively from a perspective of a sender device and a perspective of a receiver device. The following illustrates the present invention in detail from a perspective of interaction between the sender device and the receiver device.

Figure 6:
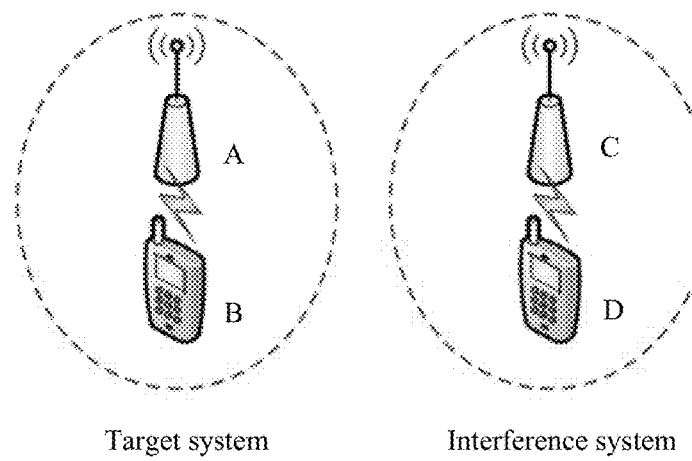
FIG. 6 is a topological diagram of a network to which a data transmission method is applied according to Embodiment 3 of the present invention.

FIG. 6 is a topological diagram of a network to which a data transmission method is applied according to yet another embodiment of the present invention. In this embodiment, a network element A is a reconstructed network access point (Access Point, AP) based on the IEEE802.11 protocol, and a network element B is a reconstructed user terminal (Station, STA) based on the IEEE802.11 protocol. A network element C is a conventional AP complying with the IEEE802.11 protocol, and a network element D is a conventional STA complying with the 802.11 protocol. A "reconstructed" network element refers to a network element that contends for a channel in a CW in a carrier sense multiple access with collision avoidance (Carrier Sense Multiple Access with Collision Avoidance, CSMA/CA) manner and allocates the channel in a scheduling window in a TDD manner, and a CW and an SW that are of the network element appear alternately. However, a "conventional" network element refers to a network element that contends for a channel only in a CSMA/CA manner, and the network element only has an SW.

As shown in FIG. 6, four network elements may listen to radio signals of each other. The network element A and the network element B are a communication pair, and the network element C and the network element D are another communication pair. The following illustrates the present invention in detail by using an example in which the network element A is a sender device, the network element B is a receiver device, data transmission is executed by the network element A and the network element B, and the network element C and the network element D have an interference effect only when a contention window contends for a channel. For clarity, a system including the network element A and the network element B is referred to as a "target system", and a system including the network element C and the network element D is referred to as an "interference system". Specifically, the data transmission method provided in this embodiment includes the following processes:

Stage 1: Contention Window Period.

The network element A, the network element B, the network element C, and the network element D all contend for a channel in the CSMA/CA manner. When obtaining a right of using a radio channel by means of contention, the network element A or the network element B hands over the right of use to a network access point, i.e., the network element A. A valid time length of the right of use that is obtained by the network element A or the network element B by means of contention is a time length of a subsequent scheduling window. In the contention window period, a specific contention operation is sending a Request To Send (Request To Send, RTS) radio frame and a Clear To Send (Clear To Send, CTS) radio frame. For details, reference may be made to the IEEE802.11, and the details are not described herein.

Stage 2: Scheduling Window Period.

In this stage, because the network element C and the network element D in the interference system are in a silent state in the scheduling window period, the network element C and the network element D may be ignored, and only actions of the network element A and the network element B in the target system are considered. The following illustrates the present invention in detail by using an example in which a data field part of a last radio frame in a scheduling window is of a structure in which a downlink period precedes an uplink period, and the network element A and the network element B transmit data over a common channel. Specifically, the data transmission method provided in Embodiment 3 of the present invention includes the following steps:

Step 1: The network element A selects a to-be-transmitted policy according to a requirement of to-be-transmitted data.

In this step, if a policy 1 is selected, step 2 is executed, and then step 4 is executed; or if a policy 2 is selected, step 3 is executed. The policy 1 is buffering the data and delaying transmission of the to-be-transmitted data; the policy 2 is normally sending the to-be-transmitted data, but prolonging a feedback time length of feedback information corresponding to the data.

Step 2: The network element A instructs the network element B to buffer the to-be-transmitted data, so that the network element B sends the to-be-transmitted data in a next scheduling window.

Specifically, this step includes the following substeps:

Step 2.1: The network element A records channel resource request information of the to-be-transmitted data in a resource request list.

When the data field part of the last radio frame in the scheduling window is of the structure in which the downlink period precedes the uplink period, a subframe after a guard interval is an uplink subframe, and the to-be-transmitted data is uplink data. In this step, the network element A records the channel resource request information of the to-be-transmitted data, that is, the uplink data, in the resource request list.

Step 2.2: The network element A notifies, by using a downlink, the network element B of a policy of delayed sending, where the network element B is a network element requesting to send the uplink data, that is, the to-be-transmitted data.

Step 2.3: The network element B buffers the to-be-transmitted data.

Step 2.4: The network element A directly allocates, to the network element B and in a non-last radio frame of a next scheduling window, a channel resource of an uplink according to the channel resource request information recorded in the resource request list.

Step 2.5: The network element B transmits, by using the channel resource obtained by means of allocation, to-be-buffered to-be-transmitted data in an uplink manner in the non-last radio frame of the next scheduling window.

Step 2.6: The network element A sends feedback information to the network element B in the non-last radio frame of the next scheduling window.

Step 3: The network element B normally sends the to-be-transmitted data to the network element A, but prolongs a feedback time length of feedback information corresponding to the data and notifies the network element A of a reset feedback information time length. Specifically, this step includes the following substeps:

Step 3.1: The network element A allocates, to the network element B and in an uplink of the last radio frame, the channel resource according to the channel resource request information of the to-be-transmitted data.

Step 3.2: The network element A instructs the network element B to prolong the feedback time length of the feedback information corresponding to the to-be-transmitted data.

In this step, the network element A instructs the network element B to set the feedback time length of the feedback information corresponding to the to-be-transmitted data to be greater than a time length of a contention window between the first scheduling window and a third scheduling window. Optionally, the setting may be performed in the following two manners:

Manner 1: The network element A notifies the network element B of a specific time length, where the time length is equal to a threshold. An optional value of the threshold is an average time length of a contention window that is obtained by surveying and statistics of a previous period of time of the network element A.

Manner 2: The network element A notifies the network element B that a processing procedure of a delay-ACK (delay-ACK) is used for the to-be-transmitted data. In this processing procedure, a time length for a timeout in waiting for the feedback information is very long, and even a limitation on a timeout in waiting for feedback information may be canceled. In this case, the feedback time length of the feedback information is greater than a time length of any contention window. For a related technology of the delay-ACK, reference may be made to the IEEE802.11, and details are not described herein.

Step 3.3: The network B transmits the to-be-transmitted data in the uplink manner and by using the channel resource obtained by means of allocation.

Step 3.4: The network element B prolongs the feedback time length of the feedback information corresponding to the to-be-transmitted data.

Step 3.5: The network element A sends, in the next scheduling window, the feedback information corresponding to the to-be-transmitted data to the network element B.

Step 4: The network element A dynamically adjusts a quantity of resources of the last radio frame.

In this step, the network element A dynamically adjusts a quantity of subframes before a guard interval and a quantity of subframes after the guard interval, where the quantity of subframes before the guard interval and the quantity of subframes after the guard interval are in the quantity of resources of the last radio frame.

Specifically, because in the policy 1, data carried by a subframe that is after the guard interval in the quantity of resources of the last radio frames is delayed to a next scheduling window or another scheduling window for transmission, in this case, the subframe after the guard interval is in an idle state. In this case, the quantity of subframes before the guard interval and the quantity of subframes after the guard interval may be adjusted, so as to fully use the subframes and avoid a resource waste.

Figure 1:
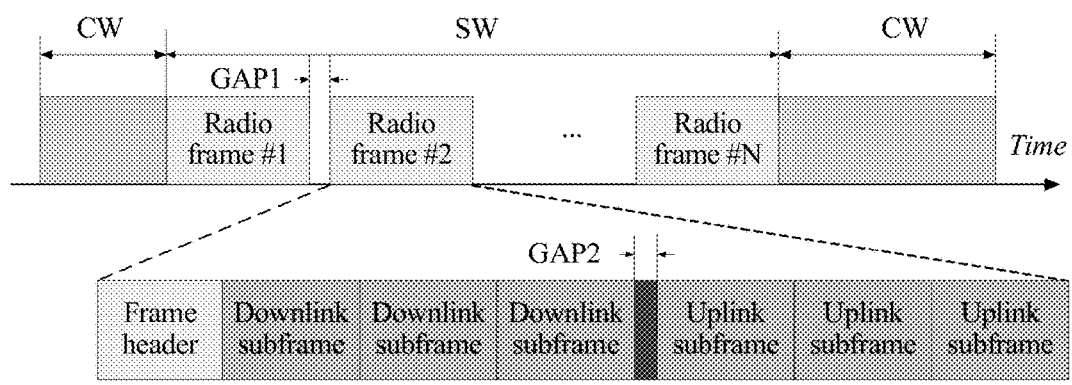
FIG. 1 is a structural diagram of a radio frame timeslot in a TDD system in the prior art.

Optionally, referring to FIG. 1, a basis of the network element A on adjusting the quantity of resources of the last radio frame is a relationship between a data volume carried by subframes that are before the guard interval and a data volume carried by subframes that are after the guard interval. In this step, the data field part of the last radio frame in the scheduling window is of the structure in which the downlink period precedes the uplink period. If the network element A determines that a data volume carried by downlink subframes is relatively small, the network element A increases a quantity of downlink subframes, and an increased total quantity of downlink subframes does not exceed a quantity of uplink subframes of another radio frame within the scheduling window; or if the network element A determines that a data volume carried by uplink subframes is relatively small, the network element A decreases the data volume of the uplink subframes and increases the quantity of downlink subframes.

In the foregoing embodiment in FIG. 6, the sender device and the receiver device transmit the data over only the common channel, and transmit the feedback information also over the common channel. However, in addition to the common channel, there may further be a dedicated channel between the sender device and the receiver device. In this case, in addition to the common channel shown in the embodiment in FIG. 6, the feedback information may further be centrally transmitted on the dedicated channel. The following illustrates, with reference to FIG. 7 and FIG. 8, the present invention in detail by using an example in which the feedback information is transmitted on the dedicated channel.

Figure 7:
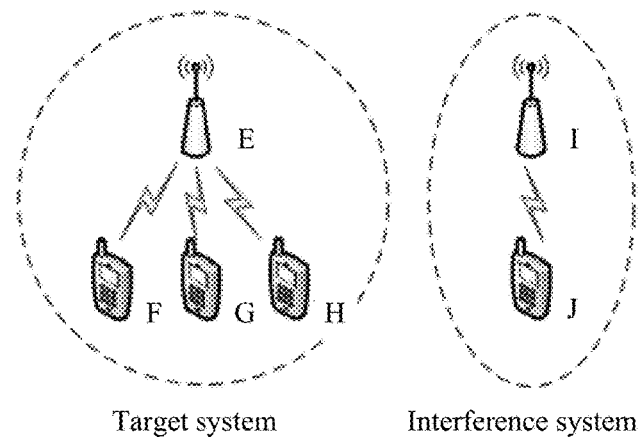
FIG. 7 is a topological diagram of a network to which a data transmission method is applied according to Embodiment 4 of the present invention.

FIG. 7 is a topological diagram of a network to which a data transmission method is applied according to still another embodiment of the present invention. In this embodiment, a network element E is a reconstructed AP based on the IEEE802.11 protocol, and a network element F, a network element G, and a network element H are reconstructed user terminals based on the IEEE802.11 protocol. A network element I is a conventional AP complying with the IEEE802.11 protocol, and a network element J is a conventional STA complying with the 802.11 protocol.

Figure 8:
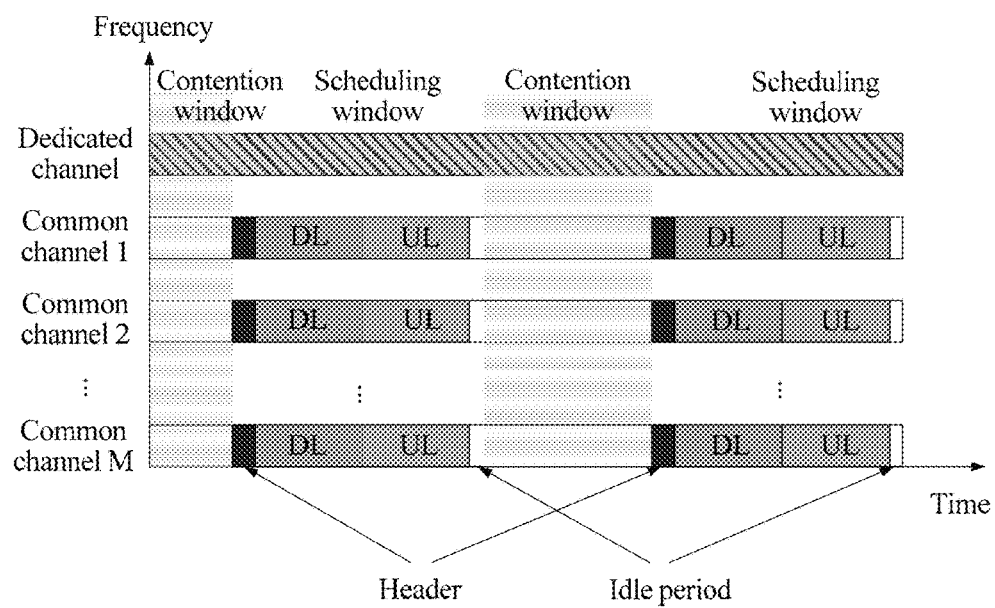
FIG. 8 is a diagram of a frequency resource to which a data transmission method is applied according to Embodiment 4 of the present invention.

As shown in FIG. 7, six network elements may listen to radio signals of each other. The network element E is a network access point that may work on multiple common channels and a dedicated channel at the same time, the network element F is connected to the network element E over a common channel 1, the network element G is connected to the network element E over a common channel 2, and the network element H is connected to the network element E over a common channel M. For details, reference may be made to FIG. 8. FIG. 8 is a diagram of a frequency resource to which a data transmission method is applied according to Embodiment 4 of the present invention.

When a dedicated channel and a common channel coexist, a structure that is of a radio frame timeslot and with which the dedicated channel and each common channel comply is the same as that of FIG. 1, that is, a structure in which a CW and an SW are alternate. A synchronization condition is satisfied between the dedicated channel and each common channel. That is, radio frames in channels of different frequencies are received and sent at the same time in a time dimension. In addition, in a same scheduling window, for a period after a guard interval (which is a GAP2 between an uplink period and a downlink period and that is not shown in FIG. 8) of a last radio frame of the common channel, an end moment is slightly shorter than a period after a guard interval of a last radio frame of the dedicated channel. That is, there is an idle period after the period after the guard interval of the last radio frame in the common channel and before a next contention window. For example, referring to FIG. 8, when a data field part of the last radio frame is of a structure in which a downlink period precedes an uplink period, there is an idle period after the downlink period and before the next contention window.

Compared with the embodiment illustrated in the foregoing FIG. 6, in this embodiment, feedback information is no longer fed back in the common channel, but feedback information in all common channels is centrally fed back on the dedicated channel. Next, referring to FIG. 7, a system including the network element E, the network element F, the network element G, and the network element H is referred to as a "target system", and a system including the network element I and the network element J is referred to as an "interference system". Specifically, the data transmission method provided in this embodiment includes the following processes:

Stage 1: Contention Window Period.

The network element E, the network element F, the network element G, and the network element H all contend for a channel in a CSMA/CA manner. When obtaining the right of using a radio channel by means of contention, the network element E, the network element F, the network element G, or the network element H hands over the right of use to a network access point, that is, the network element E. A valid time length of the right of use obtained by the network element E, the network element F, the network element G, or the network element H by means of contention is a time length of a subsequent scheduling window. In the contention window period, a specific contention operation is sending a Request To Send (Request To Send, RTS) radio frame and a Clear To Send (Clear To Send, CTS) radio frame. For details, reference may be made to the IEEE802.11, and the details are not described herein.

Stage 2: Scheduling Window Period.

In this stage, because the network element I and the network element G in the interference system are in a silent state in the scheduling window period, the network element I and the network element G may be ignored, and only actions of the network element E, the network element F, the network element G, and the network element H in the target system are considered. The following illustrates the present invention in detail by using an example in which the data field part of the last radio frame in the scheduling window is of the structure in which the downlink period precedes the uplink period, and the network element E transmits uplink data of a last radio frame in a common channel X within the scheduling window. The common channel X is any common channel in a common channel 1, a common channel 2, . . . , and a common channel M. Specifically, the data transmission method provided in Embodiment 4 of the present invention includes the following steps:

Step 1: The network element E selects a transmission policy according to a requirement of to-be-transmitted data from the common channel X.

In this step, if a policy 1 is selected, step 2 is executed, and then step 5 is executed; or if a policy 2 is selected, step 3 is executed; or if a policy 3 is selected, step 4 is executed. The policy 1 is buffering the data and delaying transmission of the to-be-transmitted data; the policy 2 is normally sending the to-be-transmitted data, but prolonging a feedback time length of feedback information corresponding to the data; the policy 3 is normally sending the to-be-transmitted data, but sending, in a first resource of the dedicated channel, the feedback information corresponding to the data, where the first resource is a resource that is on the dedicated channel and that is corresponding to an idle period of the common channel.

Step 2: The network element E instructs a network element that is connected to the network element E over the common channel X to buffer the to-be-transmitted data, so that the network element sends the to-be-transmitted data in a next scheduling window.

Specifically, this step includes the following substeps:

Step 2.1: A network element A records channel resource request information of the to-be-transmitted data in a resource request list.

When the data field part of the last radio frame in the scheduling window is of the structure in which the downlink period precedes the uplink period, a subframe after a guard interval is an uplink subframe, and the to-be-transmitted data is uplink data. In this step, the network element A records the channel resource request information of the to-be-transmitted data, i.e., the uplink data, in the resource request list.

Step 2.2: The network element A notifies, by using a downlink, a network element of a policy of delayed sending, where the network element needs to upload the to-be-transmitted data in the common channel X, and the network element is, for example, a network element that is in the network element F, the network element G, and the network element H and that is connected to the network element E over the common channel X.

Step 2.3: The network element connected to the network element E over the common channel X buffers the to-be-transmitted data.

Step 2.4: The network element E directly allocates, to the network element connected to the network element E over the common channel X and in a non-last radio frame of a next scheduling window, a channel resource of an uplink according to the channel resource request information recorded in the resource request list.

Step 2.5: The network element connected to the network element E over the common channel X transmits, by using the channel resource obtained by means of allocation, to-be-buffered to-be-transmitted data in an uplink manner in the non-last radio frame of the next scheduling window.

Step 2.6: The network element E sends, in a subframe before a guard interval of the non-last radio frame of the next scheduling window, feedback information to the network element that is connected to the network element E over the common channel X.

Step 3: The network element connected to the network element A over the common channel X normally sends the to-be-transmitted data to the network element A, but the network element prolongs a feedback time length of feedback information corresponding to the data and notifies the network element E of a reset feedback information time length. Specifically, this step includes the following substeps:

Step 3.1: The network element E allocates, to the network element connected to the network element E over the common channel X and in an uplink of the last radio frame, a channel resource according to the channel resource request information of the to-be-transmitted data.

Step 3.2: The network element E instructs, over the common channel M, the network element that is connected to the network element E to prolong the feedback time length of the feedback information corresponding to the to-be-transmitted data.

Specifically, for a manner of prolonging the feedback time length, reference may be made to step 3.2 in the foregoing FIG. 6, and details are not described herein.

Step 3.3: The network element connected to the network element E over the common channel M transmits the to-be-transmitted data in the uplink manner by using the channel resource obtained by means of allocation.

Step 3.4: The network element connected to the network element E over the common channel M prolongs the feedback time length of the feedback information corresponding to the to-be-transmitted data.

Step 3.5: The network element E sends, over the dedicated channel and in the next scheduling window, the feedback information corresponding to the to-be-transmitted data to the network element connected to the network element E over the common channel M.

It should be noted that in addition to sending, over the dedicated channel and in the next scheduling window, the feedback information corresponding to the to-be-transmitted data to the network element connected to the network element E over the common channel M, the network element E may further send, to the network element connected to the network element E over the common channel M and within this scheduling period, that is, by using a scheduling window that is on the dedicated channel and that is corresponding to the first scheduling window, the feedback information corresponding to the to-be-transmitted data.

Step 4: The network element connected to the network element A over the common channel X normally sends the to-be-transmitted data to the network element A, but does not set a prolonged feedback time length of the feedback information corresponding to the data. Specifically, this step includes the following substeps:

Step 4.1: The network element E allocates, to the network element connected to the network element E over the common channel X and in the uplink of the last radio frame, a channel resource according to the channel resource request information of the to-be-transmitted data.

Step 4.2: The network element connected to the network element E over the common channel M transmits the to-be-transmitted data in the uplink manner by using the channel resource obtained by means of allocation.

Step 4.3: The network element E sends, by using the scheduling window that is on the dedicated channel and that is corresponding to the first scheduling window, the feedback information corresponding to the to-be-transmitted data to the network element that is connected to the network element E over the common channel M.

Step 5: The network element E dynamically adjusts a quantity of resources of the last radio frame.

In this step, the network element E dynamically adjusts a quantity of subframes before a guard interval and a quantity of subframes after the guard interval, where the quantity of subframes before the guard interval and the quantity of subframes after the guard interval are in the quantity of resources of the last radio frame. For a specific adjustment manner, reference may be made to step 4 in the foregoing FIG. 6, and details are not described herein.

Figure 9:
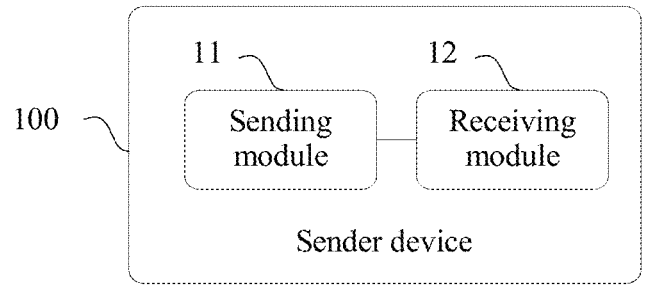
FIG. 9 is a schematic structural diagram of a sender device according to Embodiment 1 of the present invention.

FIG. 9 is a schematic structural diagram of a sender device according to Embodiment 1 of the present invention. The sender device provided in this embodiment is an apparatus embodiment corresponding to the embodiment in FIG. 4 of the present invention. A specific implementation process is not described herein. Specifically, a sender device 100 provided in this embodiment specifically includes a sending module 11 and a receiving module 12. The sending module 11 is configured to send to-be-transmitted data to a receiver device according to a transmission policy, where the to-be-transmitted data is data carried by a subframe that is after a guard interval of a last radio frame in a first scheduling window. The receiving module 12 is configured to receive feedback information sent by the foregoing receiver device.

The sender device provided in this embodiment of the present invention sends to-be-transmitted data to a receiver device according to a transmission policy that does not make a transmission manner of data carried by a subframe that is after a guard interval cause a timeout in waiting for feedback information, and receives feedback information sent by the receiver device. In this process, for to-be-transmitted data after a guard interval in a last radio frame of any scheduling window, the sender device sends the to-be-transmitted data according to the transmission policy, so that no timeout occurs when the sender device is waiting for the feedback information, thereby achieving an objective of improving data transmission efficiency.

Optionally, in an embodiment of the present invention, the sending module 11 is configured to send, over a common channel, the to-be-transmitted data to the receiver device according to the transmission policy. In that embodiment, the receiving module 12 is configured to receive, over the common channel, the foregoing feedback information sent by the receiver device. In that embodiment, the common channel is a channel over which the sender device and the receiver device transmit data.

Optionally, in an embodiment of the present invention, the sending module 11 is configured to send, over a common channel, the to-be-transmitted data to the receiver device according to the transmission policy. In that embodiment, the receiving module 12 is configured to receive, over a dedicated channel, the feedback information sent by the receiver device. In that embodiment, the common channel is a channel over which the sender device and the receiver device transmit data, and the dedicated channel is a channel over which the sender device and the receiver device transmit feedback information.

Optionally, in an embodiment of the present invention, when the transmission policy is buffering the to-be-transmitted data and sending the to-be-transmitted data in a non-last radio frame of a second scheduling window, and the second scheduling window is any scheduling window after the first scheduling window, the sending module 11 is configured to send the to-be-transmitted data in the non-last radio frame in the second scheduling window according to the transmission policy. In that embodiment, the receiving module 12 is configured to receive the feedback information sent by the receiver device in the non-last radio frame in the second scheduling window.

Optionally, in an embodiment of the present invention, when the transmission policy is setting a feedback time length of feedback information of the to-be-transmitted data to be greater than a time length of a contention window between the first scheduling window and a third scheduling window, and the third scheduling window is the first scheduling window after the first scheduling window, the sending module 11 is configured to send the to-be-transmitted data in the last radio frame in the first scheduling window according to the to-be-transmitted policy. In that embodiment, the receiving module 12 is configured to receive the feedback information sent by the receiver device in a radio frame in the third scheduling window.

Figure 10:
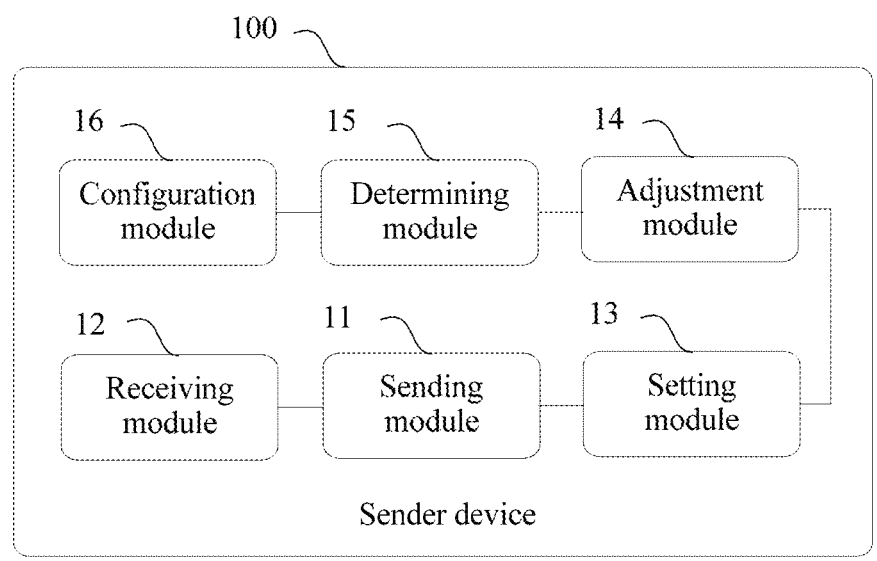
FIG. 10 is a schematic structural diagram of a sender device according to Embodiment 2 of the present invention.

FIG. 10 is a schematic structural diagram of a sender device according to Embodiment 2 of the present invention. As shown in FIG. 10, based on the structure of the apparatus shown in FIG. 9, the sender device 100 in this embodiment further includes a setting module 13. The setting module 13 can be configured to set the feedback time length of the feedback information of the to-be-transmitted data to be greater than an average time length of a contention window before the first contention window. Alternatively, the setting module 13 can be configured to set the feedback time length of the feedback information of the to-be-transmitted data to be greater than a time length of any contention window before the first contention window.

Optionally, in an embodiment of the present invention, when the transmission policy is that the receiver device sends feedback information of the to-be-transmitted data in a scheduling window that is on the dedicated channel and that is corresponding to the first scheduling window, the sending module 11 is configured to send the to-be-transmitted data in a non-last radio frame in the first scheduling window according to the to-be-transmitted policy. In that embodiment, the receiving module 12 is configured to receive the feedback information sent by the receiver device in the scheduling window that is on the dedicated channel and that is corresponding to the first scheduling window.

Referring to FIG. 10 again, optionally, the sender device provided in an embodiment of the present invention further includes an adjustment module 14. The adjustment module 14 can be configured to adjust a quantity of subframes before the guard interval of the last radio frame in the first scheduling window and a quantity of subframes after the guard interval.

Further, referring to FIG. 10 again, in an embodiment of the present invention, the sender device further includes a determining module 15. The determination module 15 can be configured to determine whether a data volume carried by the subframes that are before the guard interval is greater than a data volume carried by the subframes that are after the guard interval. In this embodiment, the adjustment module 14 can be configured to: when the determining module 15 determines that the data volume carried by the subframes that are after the guard interval is greater than the data volume carried by the subframes that are before the guard interval, increase the quantity of subframes before the guard interval, where the increased data volume of the subframes after the guard interval of the last radio frame does not exceed a data volume of subframes after a guard interval of another radio frame in the first scheduling window. Alternatively, the adjustment module 14 can be configured to when the determining module 15 determines that the data volume carried by the subframes that are after the guard interval is less than the data volume carried by the subframes that are before the guard interval, decrease the data volume of the subframes after the guard interval and increase the quantity of subframes before the guard interval.

Optionally, in an embodiment of the present invention, the receiving module 12 is further configured to: before the sending module 11 sends the to-be-transmitted data to the receiver device according to the transmission policy, receive the transmission policy sent by the receiver device.

Optionally, in an embodiment of the present invention, the sender device further includes a configuration module 16, configured to configure a to-be-transmitted policy before the sending module 11 sends the to-be-transmitted data to the receiver device according to the transmission policy.

Figure 11:
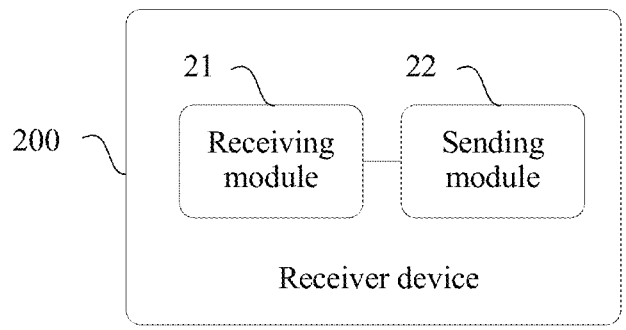
FIG. 11 is a schematic structural diagram of a receiver device according to Embodiment 1 of the present invention.

FIG. 11 is a schematic structural diagram of a receiver device according to Embodiment 1 of the present invention. The sender device provided in this embodiment is an apparatus embodiment corresponding to the embodiment in FIG. 5 of the present invention. A specific implementation process is not described herein. Specifically, a receiver device 200 provided in this embodiment specifically includes a receiving module 21 and a sending module 22. The receiving module 21 can be configured to receive to-be-transmitted data sent by a sender device according to a transmission policy, where the to-be-transmitted data is data carried by a subframe that is after a guard interval of a last radio frame in a first scheduling window. The sending module 22 can be configured to send feedback information to the sender device.

The receiver device provided in this embodiment of the present invention receives to-be-transmitted data sent by a sender device according to a transmission policy that does not make a transmission manner of data carried by a subframe that is after a guard interval cause a timeout in waiting for feedback information, and sends feedback information to the sender device. In this process, for to-be-transmitted data after a guard interval in a last radio frame in any scheduling window, the sender device sends the to-be-transmitted data according to the transmission policy, and the receiver device sends the feedback information to the sender device for the received to-be-transmitted data, so that no timeout occurs when the sender device is waiting for the feedback information, thereby achieving an objective of improving data transmission efficiency.

Optionally, in an embodiment of the present invention, the receiving module 21 is configured to receive, over a common channel, the to-be-transmitted data that is sent by the sender device according to the transmission policy. In that embodiment, the sending module 22 is configured to send, over the common channel, the feedback information to the sender device. In that embodiment, the common channel is a channel over which the sender device and the receiver device transmit data.

Optionally, in an embodiment of the present invention, the receiving module 21 is configured to receive, over a common channel, the to-be-transmitted data that is sent by the sender device according to the transmission policy. In that embodiment, the sending module 22 is configured to send the feedback information to the sender device over a dedicated channel. In that embodiment, the common channel is a channel over which the sender device and the receiver device transmit data, and the dedicated channel is a channel over which the sender device and the receiver device transmit feedback information.

Optionally, in an embodiment of the present invention, when the transmission policy is buffering the to-be-transmitted data and sending the to-be-transmitted data in a non-last radio frame of a second scheduling window, and the second scheduling window is any scheduling window after the first scheduling window, the receiving module 21 is configured to receive the to-be-transmitted data sent by the sender device in the non-last radio frame in the second scheduling window according to the transmission policy. In that embodiment, the sending module 22 is configured to send the feedback information to the sender device in the non-last radio frame in the second scheduling window.

Optionally, in an embodiment of the present invention, when the transmission policy is setting a feedback time length of feedback information of the to-be-transmitted data to be greater than a time length of a contention window between the first scheduling window and a third scheduling window, and the third scheduling window is the first scheduling window after the first scheduling window, the receiving module 21 is configured to receive the to-be-transmitted data sent by the sender device in the last radio frame in the first scheduling window according to the transmission policy. In that embodiment, the sending module 22 is configured to send the feedback information to the sender device in a radio frame in the third scheduling window.

Optionally, in an embodiment of the present invention, when the transmission policy is that the receiver device sends feedback information of the to-be-transmitted data in a scheduling window that is on the dedicated channel and that is corresponding to the first scheduling window, the receiving module 21 is configured to receive the to-be-transmitted data sent by the sender device in a non-last radio frame in the first scheduling window according to the to-be-transmitted policy; and the sending module 22 is configured to send the feedback information in the scheduling window that is on the dedicated channel and that is corresponding to the first scheduling window.

Optionally, in an embodiment of the present invention, the receiving module 21 is further configured to: before the to-be-transmitted data that is sent by the sender device according to the transmission policy is received, receive the transmission policy sent by the sender device.

Figure 12:
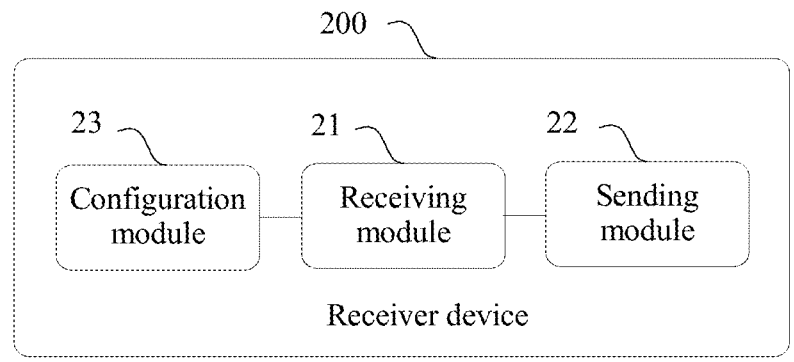
FIG. 12 is a schematic structural diagram of a receiver device according to Embodiment 2 of the present invention.

FIG. 12 is a schematic structural diagram of a receiver device according to Embodiment 2 of the present invention. As shown in FIG. 12, based on the structure of the apparatus shown in FIG. 11, the receiver device 200 in this embodiment further includes a configuration module 23 configured to configure a to-be-transmitted policy before the to-be-transmitted data that is sent by the sender device according to the transmission policy is received.

Figure 13:
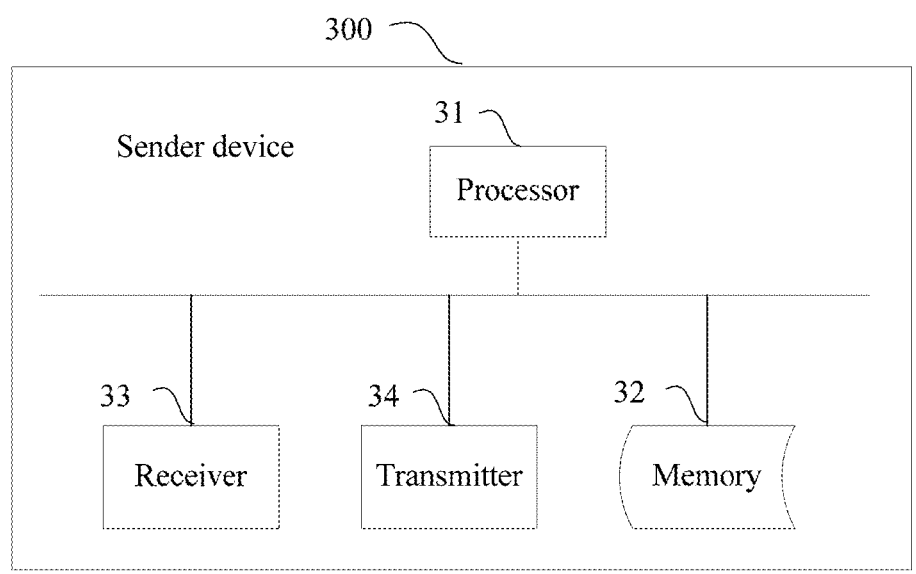
FIG. 13 is a schematic structural diagram of a sender device according to Embodiment 3 of the present invention.

FIG. 13 is a schematic structural diagram of a sender device according to Embodiment 3 of the present invention. As shown in FIG. 13, a sender device 300 provided in this embodiment includes: a processor 31 and a memory 32. The sender device 300 may further include: a transmitter 34 and a receiver 33. The transmitter 34 and the receiver 33 may be connected to the processor 31. The transmitter 34 is configured to send data or information, and the receiver 33 is configured to receive the data or the information. The memory 32 stores an executable instruction. When the sender device 300 runs, the processor 31 communicates with the memory 32, and the processor 31 invokes the executable instruction in the memory 32, so as to execute the method embodiment shown in FIG. 4; the implementation principles and technical effects thereof are similar and are not described herein.

Figure 14:
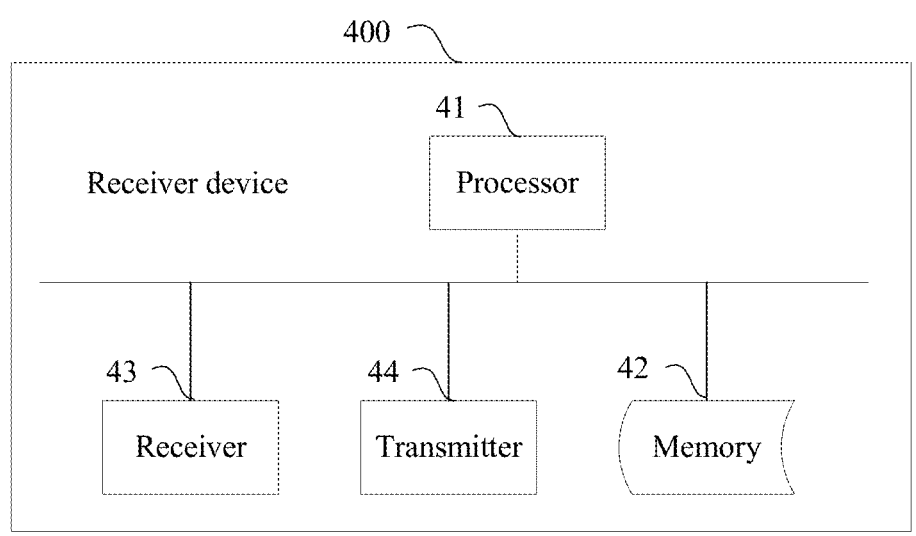
FIG. 14 is a schematic structural diagram of a receiver device according to Embodiment 3 of the present invention.

FIG. 14 is a schematic structural diagram of a receiver device according to Embodiment 3 of the present invention. As shown in FIG. 14, a receiver device 400 provided in this embodiment includes: a processor 41 and a memory 42. The receiver device 400 may further include: a transmitter 44 and a receiver 43. The transmitter 44 and the receiver 43 may be connected to the processor 41. The transmitter 44 is configured to send data or information, and the receiver 43 is configured to receive the data or the information. The memory 42 stores an executable instruction. When the receiver device 400 runs, the processor 41 communicates with the memory 42, and the processor 41 invokes the executable instruction in the memory 42, so as to execute the method embodiment shown in FIG. 5; the implementation principles and technical effects thereof are similar and are not described herein.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A data transmission method, comprising:
sending, by a sender device, to-be-transmitted data to a receiver device according to a transmission policy, wherein the to-be-transmitted data is data carried by a subframe, the subframe being after a guard interval of a last radio frame in a first scheduling window; and
receiving, by the sender device, feedback information sent by the receiver device, wherein the transmission policy is buffering the to-be-transmitted data and sending the to-be-transmitted data in a non-last radio frame of a second scheduling window, wherein the second scheduling window is any scheduling window after the first scheduling window; and, wherein sending, by the sender device, the to-be-transmitted data to the receiver device according to a transmission policy comprises:
sending, by the sender device, the to-be-transmitted data in the non-last radio frame in the second scheduling window according to the transmission policy; and
receiving, by the sender device, the feedback information sent by the receiver device comprises: receiving, by the sender device, the feedback information sent by the receiver device in the non-last radio frame in the second scheduling window.

2. The data transmission method according to claim 1, wherein the to-be-transmitted data is sent by the sender device over a common channel, and the feedback information is received by the sender device over the common channel, wherein the common channel is a channel over which the sender device and the receiver device transmit data.

3. The data transmission method according to claim 1, wherein the to-be-transmitted data is sent by the sender device over a common channel and the feedback information is received by the sender device over a dedicated channel, wherein the common channel is a channel over which the sender device and the receiver device transmit data, and the dedicated channel is a channel over which the sender device and the receiver device transmit feedback information.

4. The data transmission method according to claim 1, wherein:
the transmission policy is setting a feedback time length of feedback information of the to-be-transmitted data to be greater than a time length of a contention window between the first scheduling window and a third scheduling window, wherein the third scheduling window is the first scheduling window after the first scheduling window; and, wherein sending, by the sender device, the to-be-transmitted data to the receiver device according to a transmission policy comprises:
sending, by the sender device, the to-be-transmitted data in the last radio frame in the first scheduling window according to the to-be-transmitted policy; and
receiving, by the sender device, the feedback information sent by the receiver device comprises:
receiving, by the sender device, the feedback information sent by the receiver device in a radio frame in the third scheduling window.

5. A data transmission method, comprising:
receiving, by a receiver device, to-be-transmitted data sent by a sender device according to a transmission policy, wherein the to-be-transmitted data is data carried by a subframe, the subframe being after a guard interval of a last radio frame in a first scheduling window; and sending, by the receiver device, feedback information to the sender device, wherein the transmission policy is buffering the to-be-transmitted data and sending the to-be-transmitted data in a non-last radio frame of a second scheduling window, wherein the second scheduling window is any scheduling window after the first scheduling window; and, wherein receiving, by the receiver device, the to-be-transmitted data sent by a sender device according to a transmission policy comprises: receiving, by the receiver device, the to-be-transmitted data sent by the sender device in the non-last radio frame in the second scheduling window according to the transmission policy; and sending, by the receiver device, the feedback information to the sender device comprises: sending, by the receiver device, the feedback information to the sender device in the non-last radio frame in the second scheduling window.

6. The data transmission method according to claim 5, wherein the to-be-transmitted data is sent by the sender device over a common channel and the feedback information is received by the sender device over the common channel, wherein the common channel is a channel over which the sender device and the receiver device transmit data.

7. The data transmission method according to claim 5, wherein the to-be-transmitted data is received by the receiver device over a common channel and the feedback information is sent by the receiver device over a dedicated channel, wherein the common channel is a channel over which the sender device and the receiver device transmit data, and the dedicated channel is a channel over which the sender device and the receiver device transmit feedback information.

8. The data transmission method according to claim 5, wherein:

the transmission policy is setting a feedback time length of feedback information of the to-be-transmitted data to be greater than a time length of a contention window between the first scheduling window and a third scheduling window, wherein the third scheduling window is the first scheduling window after the first scheduling window; and, wherein receiving, by the receiver device, the to-be-transmitted data sent by the sender device according to a transmission policy comprises:

receiving, by the receiver device, the to-be-transmitted data sent by the sender device in the last radio frame in the first scheduling window according to the transmission policy; and sending, by the receiver device, the feedback information to the sender device comprises:

sending, by the receiver device, the feedback information to the sender device in a radio frame in the third scheduling window.

9. A sender device, comprising a processor configured to execute executable instructions, which when executed by the processor, and cause the processor to:

send to-be-transmitted data to a receiver device according to a transmission policy, wherein the to-be-transmitted data is data carried by a subframe, the subframe being after a guard interval of a last radio frame in a first scheduling window; and receive feedback information sent by the receiver device, wherein when the transmission policy is buffering the to-be-transmitted data and sending the to-be-transmitted data in a non-last radio frame of a second scheduling window, and the second scheduling window is any scheduling window after the first scheduling window, the sending module is configured to send the to-be-transmitted data in the non-last radio frame in the second scheduling window according to the transmission policy; and, wherein the receiving module is configured to receive the feedback information sent by the receiver device in the non-last radio frame in the second scheduling window.

10. The sender device according to claim 9, wherein the processor is further caused to:

send, over a common channel, the to-be-transmitted data to the receiver device according to the transmission policy, wherein the common channel is a channel over which the sender device and the receiver device transmit data; and receive, over the common channel, the feedback information sent by the receiver device.

11. The sender device according to claim 9, wherein the processor is further caused to:

send, over a common channel, the to-be-transmitted data to the receiver device according to the transmission policy, wherein the common channel is a channel over which the sender device and the receiver device transmit data; and receive, over a dedicated channel, the feedback information sent by the receiver device, wherein the dedicated channel is a channel over which the sender device and the receiver device transmit feedback information.

12. The sender device according to claim 9, wherein the processor is further caused to:

when the transmission policy is setting a feedback time length of feedback information of the to-be-transmitted data to be greater than a time length of a contention window between the first scheduling window and a third scheduling window, and the third scheduling window is the first scheduling window after the first scheduling window, send the to-be-transmitted data in the last radio frame in the first scheduling window according to the to-be-transmitted policy; and receive the feedback information sent by the receiver device in a radio frame in the third scheduling window.

13. A receiver device, comprising:

a processor configured to execute executable instructions, which when executed by the processor, and cause the processor to:

receive to-be-transmitted data sent by a sender device according to a transmission policy, wherein the to-be-transmitted data is data carried by a subframe, the subframe being after a guard interval of a last radio frame in a first scheduling window; send feedback information to the sender device, and wherein cause the processor further to:

when the transmission policy is buffering the to-be-transmitted data and sending the to-be-transmitted data in a non-last radio frame of a second scheduling window, and the second scheduling window is any scheduling window after the first scheduling window, the receiving module is configured to receive the to-be-transmitted data sent by the sender device in the non-last radio frame in the second scheduling window according to the transmission policy; and the sending module is configured to send the feedback information to the sender device in the non-last radio frame in the second scheduling window.

14. The receiver device according to claim 13, wherein the processor is further caused to:

receive, over a common channel, the to-be-transmitted data sent by the sender device according to the transmission policy, wherein the common channel is a channel over which the sender device and the receiver device transmit data; and send, over the common channel, the feedback information to the sender device.

15. The receiver device according to claim 13, wherein the processor is further caused to:

receive, over a common channel, the to-be-transmitted data sent by the sender device according to the transmission policy, wherein the common channel is a channel over which the sender device and the receiver device transmit data; and send the feedback information to the sender device over a dedicated channel, wherein the dedicated channel is a channel over which the sender device and the receiver device transmit feedback information.

16. The receiver device according to claim 13, wherein the processor is further caused to:

when the transmission policy is setting a feedback time length of feedback information of the to-be-transmitted data to be greater than a time length of a contention window between the first scheduling window and a third scheduling window, and the third scheduling window is the first scheduling window after the first scheduling window, receive the to-be-transmitted data sent by the sender device in the last radio frame in the first scheduling window according to the transmission policy; and send the feedback information to the sender device in a radio frame in the third scheduling window.

* * * * *